United States Patent [19]
Ohara et al.

[11] Patent Number: 5,140,580
[45] Date of Patent: Aug. 18, 1992

[54] OPTICAL DISK APPARATUS OPERATIVE WITH OPTIMAL RECORDING POWER SETTING

[75] Inventors: Shunji Ohara, Higashiosaka; Mitsuro Moriya, Ikoma; Yoshihisa Fukushima, Osaka; Kenzo Ishibashi, Moriguchi, all of Japan

[73] Assignee: Matsushita Electric Industrial Co., Ltd., Osaka, Japan

[21] Appl. No.: 617,557

[22] Filed: Nov. 26, 1990

[30] Foreign Application Priority Data

Nov. 30, 1989 [JP] Japan .................. 1-311181

[51] Int. Cl.$^5$ ................................ G11B 7/00
[52] U.S. Cl. ........................ 369/116; 369/54; 369/106; 369/124
[58] Field of Search ............ 369/116, 100, 106, 121, 369/122, 124, 53, 54, 55, 56, 57, 58, 32; 358/342

[56] References Cited

U.S. PATENT DOCUMENTS

| | | | |
|---|---|---|---|
| 4,516,242 | 5/1985 | Yokota | 369/116 |
| 4,631,713 | 12/1986 | Romeas et al. | 369/116 |
| 4,698,797 | 10/1987 | Komatsu | 369/116 |
| 4,788,674 | 11/1988 | Maeda et al. | 369/54 |
| 4,855,988 | 8/1989 | Shinbayashi et al. | 369/116 |
| 4,858,219 | 8/1989 | Yoshikawa | 369/116 |
| 4,907,212 | 3/1990 | Pharris et al. | 369/54 |
| 4,937,799 | 6/1990 | Hashimoto et al. | 369/116 |

FOREIGN PATENT DOCUMENTS

| | | |
|---|---|---|
| 0044072 | 1/1982 | European Pat. Off. . |
| 0126682 | 11/1984 | European Pat. Off. . |
| 0289004 | 11/1988 | European Pat. Off. . |
| 59-193545 | 11/1984 | Japan . |

Primary Examiner—Robert L. Richardson
Assistant Examiner—Thai Tran
Attorney, Agent, or Firm—Stevens, Davis, Miller & Mosher

[57] ABSTRACT

This invention relates to a method of determining the optimal recording power for an optical disk apparatus. Specifically, the apparatus, which records a signal on a recording medium through the projection of a laser beam at two levels of bias power and peak power, initially records a signal on an assessment track by decreasing the peak power progressively, with the bias power being fixed, determines the lower-limit peak power based on peak power immediately before the reproduced signal is first judged to be unsatisfactory by reproduced signal quality discrimination means, subsequently records a signal by decreasing the bias power progressively, with the peak power being fixed, determines the lower-limit bias power based on bias power immediately before the reproduced signal is first judges to be unsatisfactory by the reproduced signal quality discrimination means adds prescribed powers to the lower-limit peak power and bias power thereby to evaluate the optimal peak power and optimal bias power for the optical disk apparatus, and performs the recording of user data with the optimal peak power and optimal bias power.

12 Claims, 7 Drawing Sheets

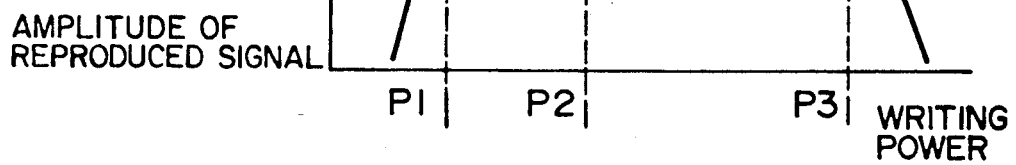
FIG. 8a
AMPLITUDE OF REPRODUCED SIGNAL
P1  P2  P3  WRITING POWER
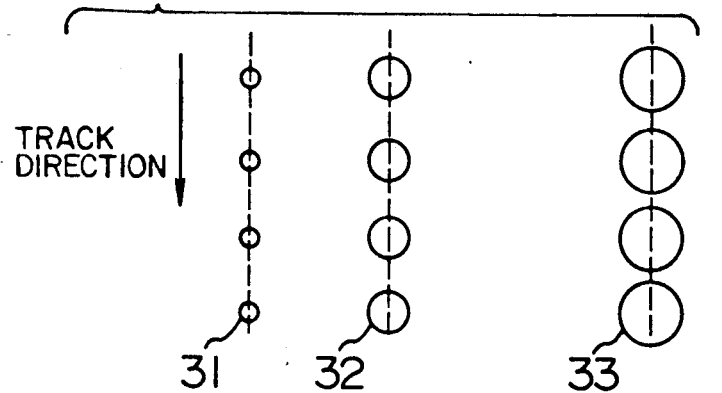
FIG. 8b
TRACK DIRECTION
31  32  33
FIG. 9
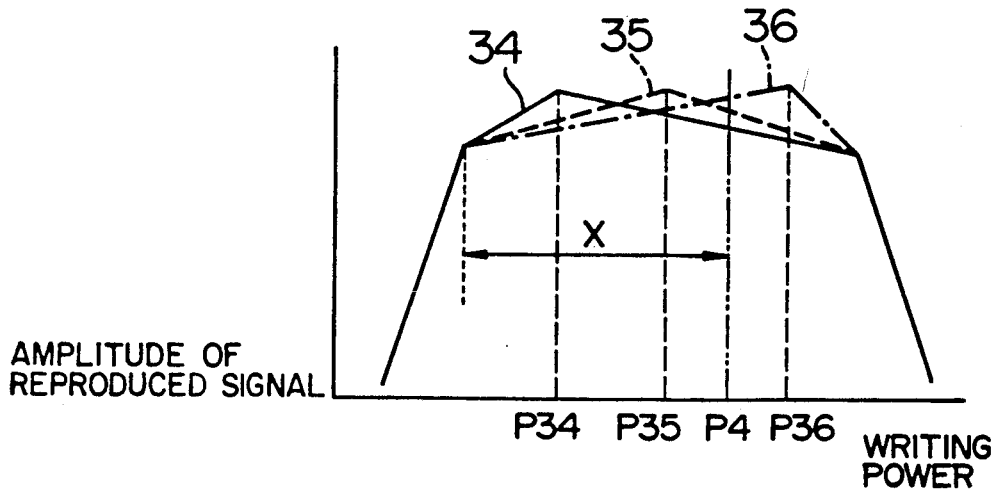
AMPLITUDE OF REPRODUCED SIGNAL
P34  P35  P4  P36  WRITING POWER

OPTICAL DISK APPARATUS OPERATIVE WITH OPTIMAL RECORDING POWER SETTING

BACKGROUND OF THE INVENTION

This invention relates to an optical information recording apparatus which operates through the projection of a focused laser beam onto a recording medium.

There have been known optical disk apparatus for recording digital data or video signals through the projection of a laser beam onto a disc-shaped recording medium. In these optical disk apparatus, recording power applied to the disk has a significant influence on the quality of record, and therefore recording with optimal power application is crucial. A conventional method for practicing this scheme is as follows, as disclosed in JP-A-59-193545 issued in 1984. In recording information signals on a recording medium through the projection of a recording beam, a signal is initially recorded by the application of a varying power. The recorded signal is reproduced thereby to find the optimal recording power which yields the best state of reproduced signal. Generally, a maximum amplitude of a signal reproduced on an optical disk provides the best signal quality, and accordingly the best state of reproduced signal implies a reproduced signal with the maximum amplitude. The above-mentioned conventional method is also designed to determine the optimal power by detecting the operation which provides the maximum amplitude (peak-to-peak value) of the reproduced signal.

However, the conventional method bases the determination of the optimal recording power on the best state of reproduced signal, and therefore it involves a problem that the determined power is not optimal for the optical disk apparatus.

The upper part (a) of FIG. 8 shows the peak power characteristics of a general optical disk, and the lower part (b) of FIG. 8 shows record marks on the recording medium produced by power with certain peak values. The term "peak power" means the above-mentioned recording power. In the upper part (a) of FIG. 8, the horizontal axis represents the peak power and the vertical axis represents the amplitude or S/N of reproduced signals, and in the lower part (b) of FIG. 8, indicated by 31, 32 and 33 are record marks produced by respective peak powers along the track direction indicated by the arrow. Peak power from 0 to P1 is the range of insufficient power, in which satisfactory record marks are not produced and reproduced signals have insufficient amplitudes. P1 is the smallest peak power to produce a satisfactory record mark. As the peak power increases from P1 to P2, record marks become larger, producing greater amplitude of reproduced signals. When the peak power exceeds P2, the record mark becomes to have duties above 50%, and the amplitude of the reproduced signal begins to fall due to a deficient resolution. When the peak power further increases beyond P3, the destruction of recording medium begins and the reproduced amplitude falls sharply. In conclusion, the peak power which provides the best state of reproduced signal is P2. The above-mentioned peak power characteristics vary depending on the type of recording medium as shown by 34, 35 and 36 in FIG. 9. The recording medium 34 has the peak power P2 for the maximum (best) reproduced signal emerging nearer to the P1, the recording medium 36 has the P2 nearer to the P3, and the recording medium 35 has the P2 amid the P1 and P3. FIG. 9 has the same coordinates as the (a) part of FIG. 8. The optimal power for the optical disk apparatus is chosen at a peak power P4 which is slightly higher than the center of the power range suitable for recording and reproduction (e.g., the range between P1 and P3 on the peak power characteristics of FIG. 9) in consideration that the emergence of some abnormality in data recording (e.g., out-tracking of the servo system due to a shock or vibration, variation of peak power due to a temperature change, presence of dust particles on the disk or lens, etc.) results in a virtual variation of peak power on the disk. The reason for the slightly higher setting of the peak power is based on the fact that the emergence of the above-mentioned abnormality results in a virtual reduction of peak power in many cases. In FIG. 9, value X is called "power margin", and it represents the admissible power reduction for signal reproduction without the occurrence of error.

On this account, the peak power which provides the best state of reproduced signal for the optical disk (recording medium), i.e., those shown by P34, P35 and P36 in FIG. 9, in not necessarily consistent with the optimal peak power P4 for the optical disk apparatus, and therefore it is difficult for the conventional optical disk apparatus, which determines the peak power based on the best recording state of reproduced signal, to find the optimal peak power for the apparatus.

Moreover, the conventional method cannot be applied to optical disk apparatus with the ability of overwriting. FIG. 10 shows the method of light projection for overwriting a phase-mode optical disk. In the figure, shown by (a) is the light modulation waveform, (b) is a recording track before overwriting, and (c) is a recording track after overwriting. Indicated by 40 is the bias power, 41 is the peak power, 42 is the crystalline state, and 43 is the amorphous state. Phase-mode material allows overwriting of signals based on its different optical reflectivity between the amorphous state and the crystalline state. Overwriting of signals is the capability of recording a new signal without erasing the old signal which has been recorded in the past. The amorphous state and crystalline state are attained by light modulation at two laser power levels, i.e., peak power and bias power, as shown in FIG. 10. Namely, regardless of the state of a recording track before overwriting, a portion where the peak power is applied becomes amorphous and a portion where the bias power is applied becomes crystalline, and this allows overwriting of a new signal. Although the optimal bias power and optimal peak power need to be set for an apparatus with the ability of overwriting, the conventional apparatus cannot set two power levels necessary for overwriting.

SUMMARY OF THE INVENTION

This invention is intended to overcome the foregoing prior art deficiency, and it provides an optical disk apparatus operative to overwrite user signals at the above-mentioned optimal power levels through the provision of a start circuit which initiates the optimal power setting operation, means for recording a signal while varying the peak power progressively, with the bias power being fixed, means for discriminating the quality of reproduced signal thereby to judge whether the recorded signal is useful or not, and means for determining the lower-limit peak power based on the lowest peak power among powers which have been judged to be useful by the reproduced signal quality discrimination means, and means for recording the signal while varying the bias power progressively, with the peak power being fixed, means for discriminating the quality of reproduced signal for judging whether the recorded signal is useful or not, means for determining the lower-limit bias power based on the lowest bias power among powers which have been judged to be useful by the reproduced signal quality discrimination means, and means for evaluating the optimal powers by adding a prescribed power to the lower-limit peak power and lower-limit bias power.

The inventive optical disk apparatus is operative to overwrite use signals through the provision of bit error discrimination means as the reproduced signal quality discrimination means, which determines the lower-limit peak power and lower-limit bias power based on the lowest powers among powers by which bit error is judged to be admissible by the bit error discrimination means, and evaluates the optimal powers by adding a prescribed power to the lower-limit peak power and lower-limit bias power.

The inventive optical disk apparatus is designed to evaluate the optimal power each time the apparatus is powered on, the recording medium is replaced, error is detected in data recorded by the user, a certain time length has been expired since the last optimal power setting, the temperature has changed in excess of a prescribed limit, or a shock or vibration in excess of a certain magnitude is applied to the apparatus.

BRIEF DESCRIPTION OF THE DRAWINGS

FIGS. 8(a), 8(b) and 9 are graphs of peak power characteristics used to explain the problem involved in the conventional apparatus; and Diagram

Throughout the diagrams, indicated by 6 is a reproduced signal quality discrimination circuit, 9 is a laser power setting circuit, 11 is a drive control circuit, 12 is a reference voltage generation circuit, 13 is a comparator circuit, 14 is a bit error discrimination circuit, 15 is a PLL circuit, 16 is a data discrimination circuit, 19 is a start circuit, 40 is the bias power, and 41 is the peak power.

DESCRIPTION OF THE PREFERRED EMBODIMENT

Figure 1:
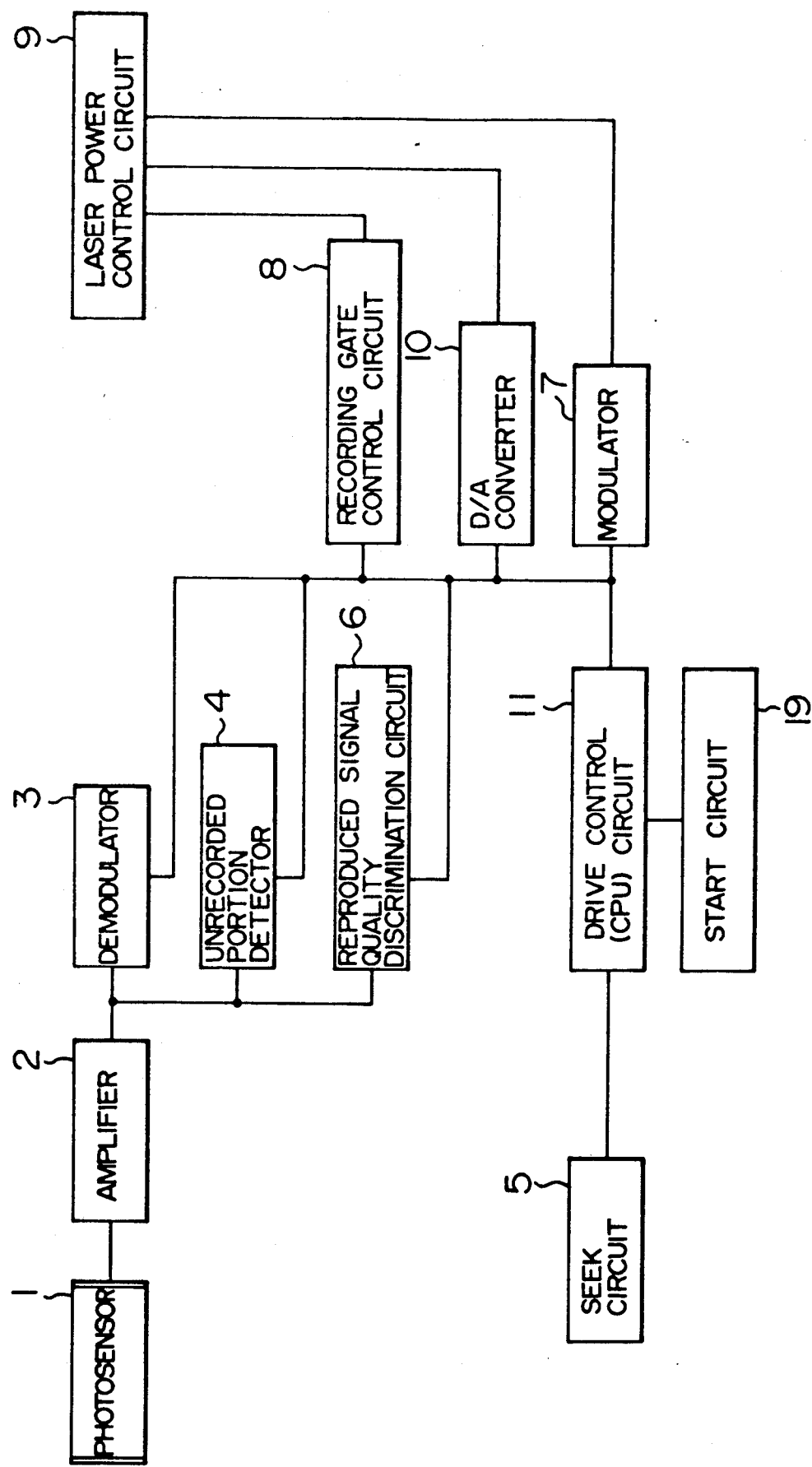
FIG. 1 is a block diagram of the optimal power setting circuit/based on an embodiment of this invention.

FIG. 1 is a block diagram showing an embodiment of this invention for finding the optimal peak power of the optical disk apparatus. In the figure, indicated by 1 is a photosensor which detects a signal reproduced on an optical disk, 2 is an amplifier which amplifies the reproduced signal, 3 is a demodulator which demodulates data in the reproduced signal and the address formed on the disk, 4 is an unrecorded portion detector which detects the presence or absence of the reproduced signal, 5 is a seek circuit which seeks an intended track, 6 is a reproduced signal quality discrimination circuit, 7 is a modulator which modulates data from a drive control circuit which will be explained later, 8 is a recording gate control circuit, 9 is a laser power control circuit for the laser which is used to record and/or erase a signal, and 10 is a D/A (digital to analog) converter which converts the value of laser power produced by the drive control circuit 11 made up of a microcomputer into an analog value and determines the laser power value of the laser power control circuit. The drive control circuit 11 is further connected with the demodulator 3, unrecorded portion detector 4, seek circuit 5, reproduced signal quality discrimination circuit 6, modulator 7, and recording gate control circuit 8, thereby controlling these circuits. For example, signal recording takes place in such a manner that data produced by the drive control circuit is modulated into a recording signal by the modulator 7, recording and bias power are provided to the D/A converter 10, and the recording gate is enabled by the operation of the recording gate control circuit 8. Indicated by 19 is a start circuit which initiates the operation of finding the optimal peak power carried out by the above-mentioned circuits.

Figure 2:
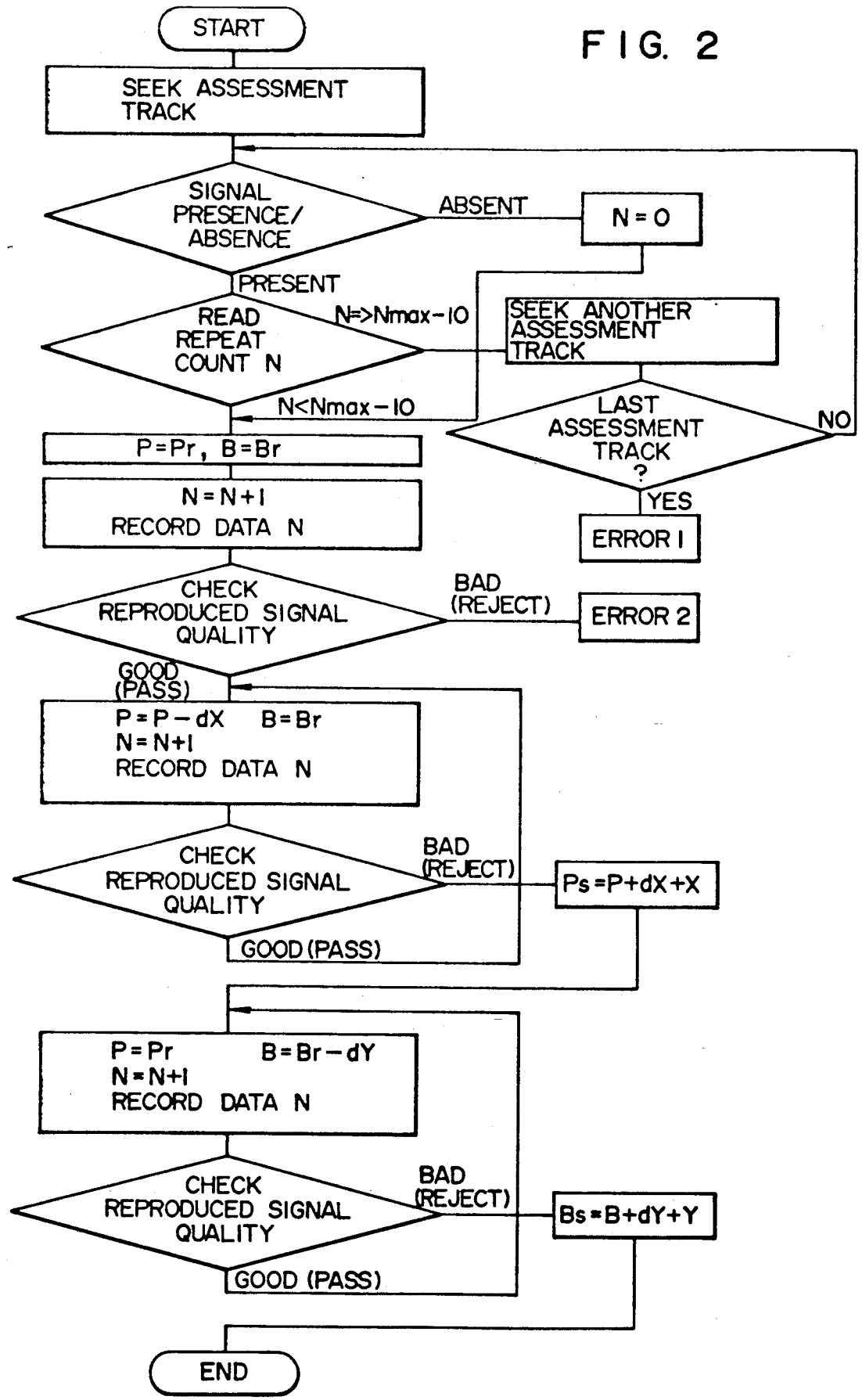
FIG. 2 is a flowchart showing the optimal power setting method based on an embodiment of this invention.

The operation of the block diagram will be explained on the flowchart of FIG. 2. In response to the command from the start circuit 19, the drive control circuit 11 initiates the operation for finding the optimal power. Initially, the drive control circuit 11 operates on the seek circuit 5 to seek assessment tracks. The assessment tracks are used to assess the recording state, and are located outside the user area, for example. The reproduced signal from an assessment track is fed from the photosensor 1 through the amplifier 2 to the unrecorded portion detector 4 and demodulator 3. The unrecorded portion detector 4 detects the presence or absence of an already recorded signal on the assessment track. If the signal is absent, a repetition count register N in the drive control circuit is set to zero. If a signal is already recorded, the demodulator 3 demodulates the signal, and the number of times of use of the assessment track (number of repetitions) is read from the recorded signal and its value is set in the register N. If the number of repetitions is greater than or equal to $N_{max}-10$, the seek circuit 5 seeks another assessment track. The $N_{max}$ is the allowable maximum number of times of repetitive recording on an assessment track. The reason for the use of value $N_{max}-10$ is based on the assumption that a same assessment track will be recorded about 10 times repeatedly in one operation to determine the optimal bias power, and the value 10 may be altered.

In case a newly seeked assessment track is the last assessment track, error 1 is reported to the user, and the optimal power setting operation terminates, otherwise detection of data on the assessment track and reading of the number of repetitions are carried out again. In case the number of repetitions is less than $N_{max}-10$, a peak power setting register P in the drive control circuit is set with the reference peak power value Pr which is determined upon the design criteria, and a bias power setting register B in the drive control circuit is set with the reference bias power value Br predetermined upon the design criteria. Value $N+1$ is set to the repetition count register N, and the data in N is recorded on the assessment track at both power levels. The reproduced signal quality discrimination circuit 6 discriminates the signal recorded at both power levels, and in the case of a negative discrimination result for a reproduced signal, error 2 is reported to the user, and the optimal power setting operation terminates. In the case of a positive discrimination result, setting of the optimal peak power takes place first by following the procedure described in the following. The peak power setting register P is re-set to a power level which is lower by dX than the currently set power level, data $N+1$ is set to the repetition count register N and the data in N is recorded. The data is subjected to discrimination by the reproduced signal quality discrimination circuit 6. In the case of a positive discrimination result, the peak power is lowered by dX again, and the reduction of peak power is repeated until the reproduced signal quality discrimination circuit 6 produces a negative discrimination result. When the reproduced signal quality discrimination circuit 6 has made the first negative judgement, the value in the peak power register P added by dX comes to the lower-limit peak power for the correct recording of data. The lower-limit peak power superimposed by the above-mentioned power margin X (see FIG. 9) comes to the optimal peak power Ps $(Ps=P+dX+x)$ for the optical disk apparatus.

The optimal bias power is set in the similar procedure. The bias power setting register B is set to a power level which is lower by dY than the currently set power level, data $N+1$ is set to the repetition count register, and the data is recorded. The data is subjected to discrimination by the reproduced signal quality discrimination circuit 6. In the case of a positive discrimination result, the bias power is lowered by dY, and the reduction of bias power is repeated until the reproduced signal quality discrimination circuit 6 produces a negative discrimination result. When the reproduced signal quality discrimination circuit 6 has made the first negative judgement, the value in the bias power register B added by dY comes to the lower-limit bias power for the correct recording of data. The lower-limit bias power superimposed by the power margin Y comes to the optimal bias power Bs $(Bs=B+dY+Y)$ for the optical disk apparatus.

The following explains in detail the power margins X and Y to be added to both lower-limit powers. The power margins have been determined so that the deficiency of reproduced signal does not result due to virtual peak power variation or bias power variation caused by some abnormality in the practical operation after the setting of the above-mentioned optimal. For the power margins X and Y, power levels are selected to be a little greater than half the range of upper and lower-limit powers (see FIG. 9), at which the reproduced signal quality discrimination circuit 6 makes a positive judgement for the reproduced signal. The reason for the threshold of half or above is that the major cause of power variation is dusts and servo out-tracking, which will result rather in a power reduction than a power increase. It is also possible to alter the power margins before the user's recording operation. For example, following the optimal power setting operation, the values of power margin can be altered referring to detected values of the time length until the user actually records data, the variation in temperature, shock or vibration, etc., thereby enhancing the reliability of the power margin values.

The present invention described above is summarized as follows. One of the peak power and bias power is fixed and the other is reduced gradually (by dX or dY at a time) thereby to find the lower-limit powers at which the reproduced signal quality discrimination circuit 6 makes a positive judgement for the recorded signal, and the other power vice versa, and the marginal powers (X and Y) are added to the derived lower-limit powers to determine the optimal peak power and optimal bias power.

The optimal peak power and optimal bias power based on this invention are the optimal powers for the optical disk apparatus, and the optimal powers for the optical disk apparatus are not powers which provide the best reproduced signal, but instead which imply the peak power and bias power having power margins on both the lower and higher power sides in order to prevent defective reproduction due to a small abnormality (virtual power variation in recording and erasure).

These are the method of setting the optimal peak power and optimal bias power. It is also possible for the inventive method to set only the peak power for a disk which is recorded without a bias power, such as a disk of write-once type.

Conceivable conditions of starting the foregoing optimal power searching operation by the start circuit 19 are the turning-ON of the optical disk apparatus and/or the replacement of disk and/or the emergence of reproduction error in the signal recorded by the user. Because of the presence of variable performance among optical disk apparatus and among optical disks (recording medium), it is intended to correct the optimal power to match between the optical disk apparatus and optical disk that are going to be used. Other conceivable conditions are the expiration of a certain time length as detected by a timer incorporated in the start circuit 19, a temperature change in excess of a certain limit as detected by a thermal sensor incorporated in the circuit, or the application of a shock or vibration as detected by a shock/vibration sensor incorporated in the circuit. And the optimal power searching operation may be executed on request to reset the set powers by a user or particularly a host computer executing a diagnosis on the optical disk apparatus or the optical disks. These schemes are intended to correct the optimal power to meet the performance at the time of user of the optical disk apparatus which has changed due to a change in the operational environment (temperature, shock or vibration, dusts, etc.). The correction of optimal powers are not to be executed during data are recorded by a user.

Figure 3:
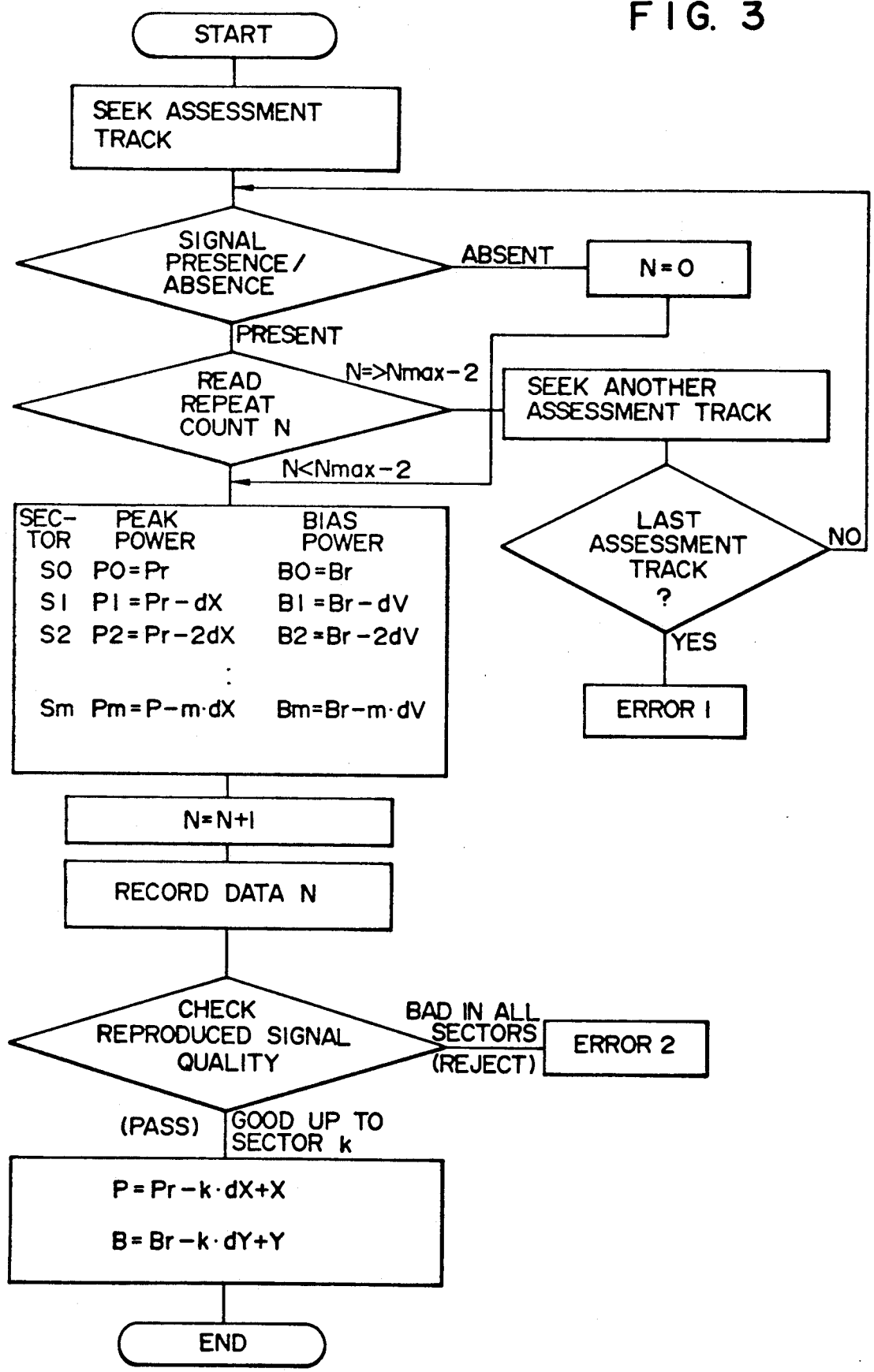
FIG. 3 is a flowchart showing the optimal power setting method based on another embodiment of this invention.

FIG. 3 is a flowchart used to explain another embodiment of this invention. The arrangement of the circuit blocks used in the apparatus is identical to the first embodiment shown in FIG. 1, but the software used in the drive control circuit 11 is different. In FIG. 3, the operation from the beginning until the finding of the assessment track is shown in FIG. 2, and its explanation is not repeated. The reason for setting an upper limit value of $N_{max}-2$ for the number of repetitions is to use the same assessment track twice until the optimal power is found, and this value may be altered.

Generally, an optical disk designed to record data is partitioned into sectors, and accordingly the assessment track is made up of plural sectors. These sectors are recorded at different power levels. The peak power and bias power of each sector is set in the following manner, for example. Sector 0 has its peak power P0 set to the reference peak power level Pr which is decided according to the design criteria and its bias power B0 set to the reference bias power level Br decided on the design criteria. Sector 1 has its powers P1 and B1 set to $Pr-dX$ and $Br-dY$, respectively. Sector 2 has its powers P2 and B2 set to $Pr-2dX$ and $Br-2dY$, respectively. In this manner, sector m has its powers Pm and Bm set to $Pr-m.dX$ and $Br-m.dY$, respectively, for recording.

Signals recorded in the sectors are examined by the reproduced signal quality discrimination circuit 6. Supposing that sector k first makes a positive judgement for the reproduced signal, the lower-limit peak power and lower-limit bias power are evaluated to be $Pr-k.dX$ and $Br-k.dY$, respectively, and these values added by the power margins X and Y, i.e., $P=Pr-k.dX+x$ and $B=Br-k.dY+Y$, come to the optimal peak power and optimal bias power.

If signals, which have been recorded in all sectors at progressively varying power levels, are all rejected by the reproduced signal quality discrimination circuit 6, error 2 is informed to the user and the optimal power setting operation terminates.

As described above, the foregoing two methods of finding the optimal power for the optical disk apparatus are both designed to find a useful lower-limit peak power and/or lower-limit bias power with the reproduced signal quality discrimination circuit 6, and thereafter to set the optimal peak power and optimal bias power for the optical disk apparatus.

Figure 4:
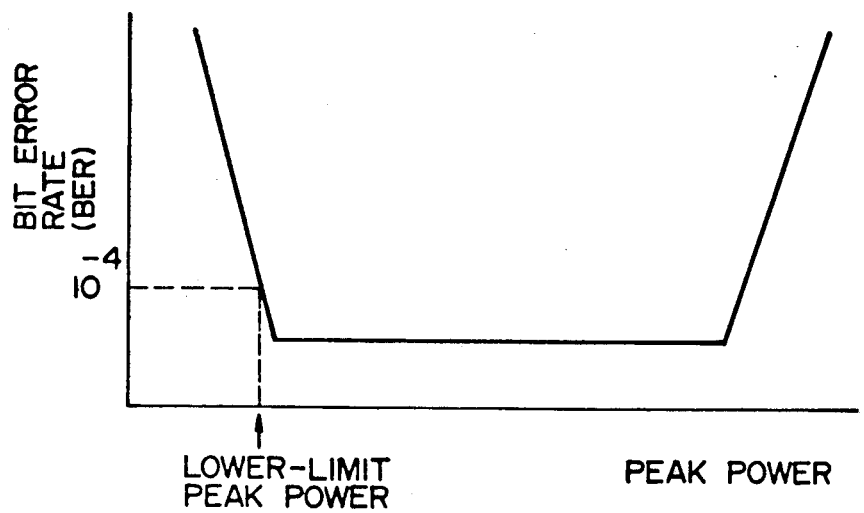
FIG. 4 is a graph used to explain the principle of the reproduced signal quality discrimination circuit based on this invention.

FIG. 4 is a diagram used to explain the principle of operation of the reproduced signal quality discrimination circuit 6 formed of a bit error discrimination circuit. The diagram shows the bit error rate (will be termed BER hereinafter) vs. peak power characteristics. The horizontal axis represents the peak power, and the vertical axis represents the BER. When the peak power is increased progressively from the bottom, the BER becomes better (falls in the BER value), and in response to the detection of BER below the admissible BER value, e.g., $10^{-4}$ or less the reproduced signal quality discrimination circuit 6 makes a positive judgement for the reproduced signal and informs it to the drive control circuit. This peak power comes to the lower-limit peak power. By discriminating the quality of the reproduced signal based on the BER, in which BER varies greatly relative to the peak power at points about the lower-limit power, the lower-limit peak power can easily be found. Conversely, the BER does not vary greatly at points beyond the lower-limit power, and it is difficult to find the peak power which provides the best reproduced signal.

In the practical operation, it is conceivable that the virtual peak power falls down to the lower-limit power due to any of the above mentioned abnormalities. Therefore, in order to enhance the reliability of signal at the lower-limit power, the BER at the lower-limit power is measured precisely in the following manner.

Figure 5:
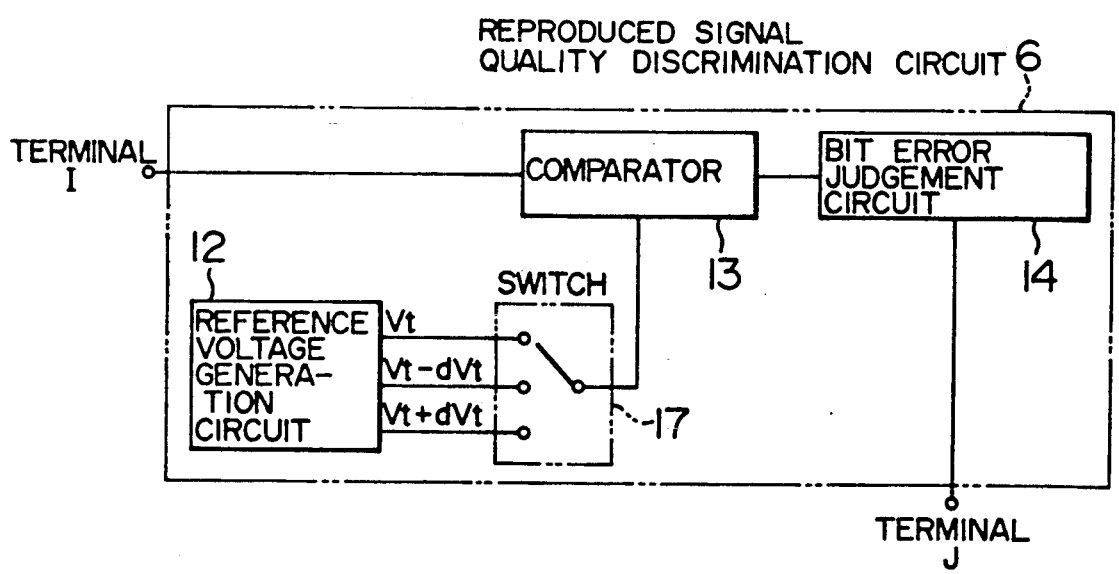
FIG. 5 is a block diagram of the reproduced signal quality discrimination circuit based on the embodiment of this invention.

FIG. 5 shows another embodiment of the reproduced signal quality discrimination circuit 6 used in the present invention. Terminal I receives the reproduced signal from the assessment track provided by the amplifier 2, and terminal J delivers the result of judgement by the reproduced signal quality discrimination circuit 6 to the drive control circuit. Normally, the analog reproduced signal is compared by the comparator circuit 13 with the reference voltage Vt (voltage level half the amplitude of the reproduced signal, in general) produced by the reference voltage generation circuit 12, and the resulting binary signal is sent to the bit error judgement circuit 14. In the present case, however, in order to enhance the reliability of signal at the lower-limit power, the reference voltage is switched between $Vt+dVt$ and $Vt-dVt$ during the process of finding the lower-limit power, and such a power that does not cause a bit error based on the comparison with both of the two reference voltages is appointed to be the lower-limit power of recording and/or bias power. Based on the bi-level reference voltages, bit errors caused by uneven amplitude of reproduced signal due to a lacking peak power or caused by the residual of erasure due to a lacking bias power can be checked more strictly, whereby the reliability of recorded signal at the lower-limit power is enhanced.

Figure 6:
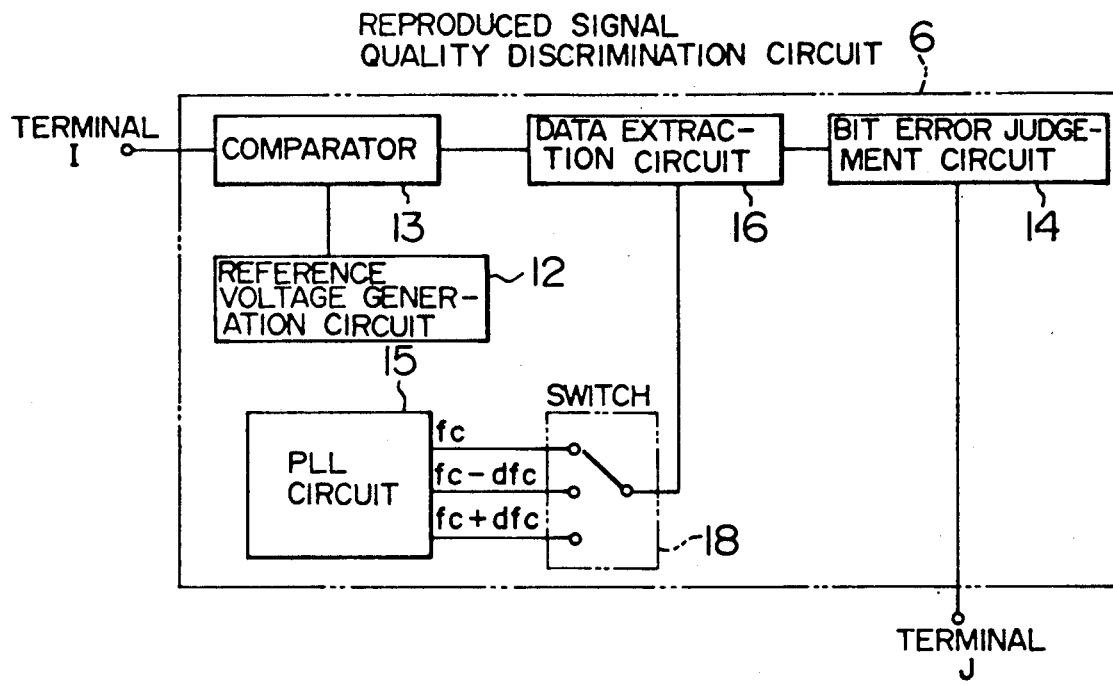
FIG. 6 is a block diagram of the reproduced signal quality discrimination circuit based on another embodiment of this invention.

FIG. 6 shows another embodiment of the invention which is intended to enhance the reliability of signal at the lower-limit power. The figure is a block diagram of another embodiment of the reproduced signal quality discrimination circuit 6. Circuit blocks identical to those of FIG. 5 are given the common reference numbers. The binary signal provided by the comparator is subjected to data extraction by a data extraction circuit 16 used with reference clock produced by a known PLL (phase-locked loop) circuit 15, and the extracted data are sent to the bit error judgement circuit 14. Normally, the reference clock is set to the clock frequency fc for data. In the present case, however, in order to enhance the reliability of signal at the lower-limit power, the reference clock frequency is switched between $fc+dfc$ and $fc-dfc$ in the process of finding the lower-limit power, so that such a power that does not cause a bit error based on the data extraction at the two frequencies is appointed to be the lower-limit power of recording and/or bias power. Based on the two reference clock frequencies, bit errors caused by defective S/N due to a lacking peak power or bias power, or in other words, bit errors caused by the jitter of reproduced signal (swing of the time axis of reproduced signal) can be checked more strictly, whereby the reliability of recorded signal at the lower-limit power is enhanced.

Figure 7:
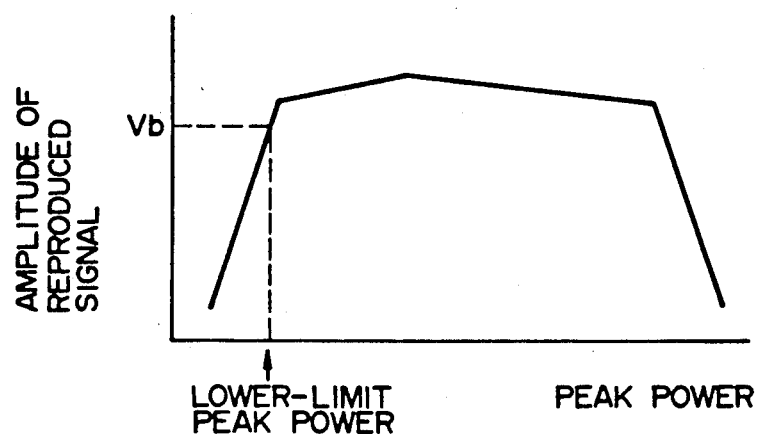
FIG. 7 is a graph used to explain the principle of the reproduced signal quality discrimination circuit of the other embodiment.
Figures 10A, 10B, 10C:
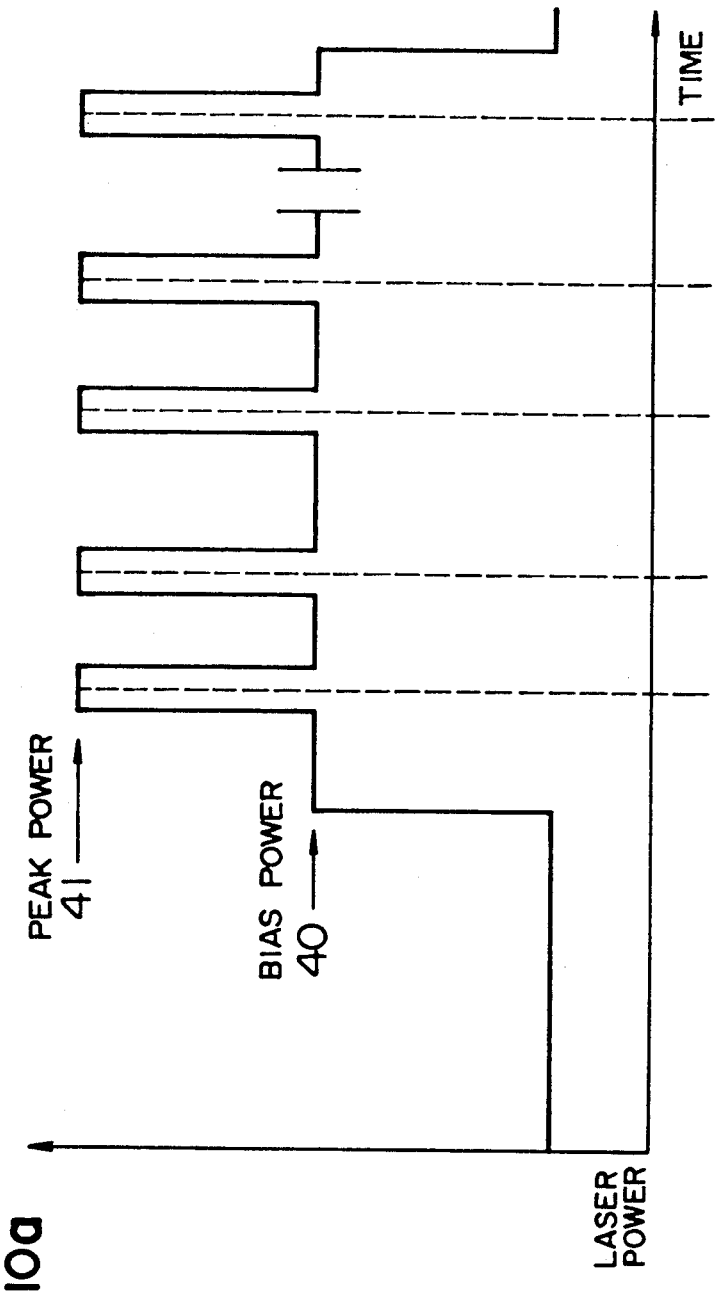
FIGS. 10a–10c are used to explain the principle of recording on a phase-mode optical disk.

FIG. 7 is a diagram used to explain the principle of operation of the reproduced signal quality discrimination circuit 6 formed of a reproduced signal amplitude discrimination circuit. The diagram shows the reproduced signal vs. peak power characteristics. The horizontal axis represents the peak power and the vertical axis represents the amplitude of reproduced signal. As the peak power is increased progressively from the bottom, the signal amplitude increases. In response to the detection of the amplitude beyond the admissible amplitude Vb, the reproduced signal quality discrimination circuit 6 makes a positive judgement for the reproduced signal and informs it to the drive control circuit. The peak power at this point comes to the lower-limit peak power. Since the amplitude of reproduced signal relative to the peak power at points about the lower-limit power varies greatly, the lower-limit peak power can easily be found. Conversely, there is no great variation in the signal amplitude above the lower-limit power, and it is difficult to find the peak power which provides the maximum amplitude of reproduced signal, as in the conventional apparatus.

As described above, this invention is designed to find the lower-limit peak power and lower-limit bias power, and thereafter find the optimal power for the optical disk apparatus, and consequently the optimal power can easily be found and it becomes possible to set the optimal power definitely and uniquely. The optimal power found based on this invention is the optimal power for the optical disk apparatus, and even if such abnormalities as servo out-tracking and power fluctuation emerge due to en environmental change during the practical operation, the presence of a marginal power, which impedes the reproduced signal become defective, enhances the stability of the optical disk apparatus.

In addition, this invention is designed to discriminate the signal quality at the lower-limit power more strictly than the usual manner, resulting in a higher reliability of signal at the lower-limit power. Moreover, according to this invention, even if there exists the variability of performance among optical disk apparatus and among optical disks (recording mediums), the optimal power can be corrected to match the optical disk apparatus and optical disk that are going to be used, or even if there arises an environmental change (temperature, shock or vibration, dusts, etc.) during the operation of the optical disk apparatus, the optimal power can be corrected to match the performance at the time of operation, whereby a reliable optical disk apparatus which is immune to the influence of environmental changes can be offered.

What is claimed is:

1. An optical disk apparatus for recording a signal on a recording medium having an assessment track through projection of a laser beam having a power setting set at an optimal level, said apparatus comprising:

initialization means for initially recording a signal on said assessment track by varying a power level of the laser beam progressively;

reproduction means for reproducing said signal recorded on said assessment track;

estimating means for estimating a reproduction quality of the signal reproduced by said reproduction means;

means for determining a lower-limit power which is lowest in a range of recording power in which the signal reproduced by said reproduction means is judged to be satisfactory by said estimating means; and adding means for adding a prescribed power to said lower-limit power to establish the optimal level of said power setting of the projecting laser beam.

2. An optical disk apparatus according to claim 1, wherein said estimating means comprises:

means for generating at least one voltage including a reference voltage, a first comparison voltage which is higher than said reference voltage and a second comparison voltage which is lower than said reference voltage;

comparator means for converting the signal reproduced by said reproduction means into a binary signal based on a comparison with at least one of said voltages; and means for judging bit errors contained in said binary signal.

3. An optical disk apparatus according to claim 1, wherein said estimating means comprises:

comparator means for converting the signal reproduced by said reproduction means into a binary signal;

phase-locked loop (PLL) means for producing at least one signal selected from a group including a first signal having a reference frequency, a second signal having a higher frequency than said reference frequency and a third signal having a lower frequency than said reference frequency;

means for extracting data from said binary signal based on at least one of said first signal, said second signal and said third signal; and bit error judgement means for judging bit errors contained in said data.

4. An optical disk apparatus according to claim 1, wherein said estimating means decides said reproduction quality based on an amplitude of the signal reproduced by said reproduction means.

5. An optical disk apparatus according to claim 1, wherein said estimating means comprises bit error judgement means for judging bit errors in said signal reproduced by said reproduction means and decides said reproduction quality based on bit errors judged by said bit error judgment means.

6. An optical disk apparatus for recording a signal on a recording medium through projection of a laser beam at two levels comprising bias power and peak power, said apparatus comprising:

first recording means for initially recording a signal on the recording medium by varying the peak power of said laser beam progressively, with the bias power being fixed;

first reproducing means for reproducing said signal recorded by said first recording means;

first estimating means for estimating a reproduction quality of the signal reproduced by said first reproducing means;

first determining means for determining a lower-limit power which is lowest in a range of progressively varied recording power of the laser beam in which the signal reproduced by said first reproducing means is judged to be satisfactory by said first estimating means;

second recording means for subsequently recording a signal on the recording medium by varying the bias power of said laser beam progressively, with the peak power being fixed;

second reproducing means for reproducing said signal recorded by said second recording means;

second estimating means for estimating a reproduction quality of the signal reproduced by said second reproducing means;

second determining means for determining a lower-limit power which is lowest in a range of progressively varied recording power of the laser beam in which the signal reproduced by said second reproducing means is judged to be satisfactory by said second estimating means; and adding means for adding first and second prescribed powers to said lower-limit bias power and said peak power respectively to establish optimal bias and peak powers of the projecting laser beam.

7. An optical disk apparatus according to claim 6, wherein said first estimating means comprises:

means for generating at least one voltage including a reference voltage, a first comparison voltage which is higher than said reference voltage and a second comparison voltage which is lower than said reference voltage;

comparator means for converting the signal reproduced by said first reproducing means into a binary signal based on a comparison with at least one of said voltages; and means for judging bit errors contained in said binary signal; and wherein said second estimating means comprises:

means for generating at least one voltage including a second reference voltage, a third comparison voltage which is higher than said second reference voltage and a fourth comparison voltage which is lower than said second reference voltage;

comparator means for converting the signal reproduced by said second reproducing means into a second binary signal based on a comparison with at least one of said second reference voltage, said third comparison voltage and said fourth comparison voltage; and means for judging bit errors contained in said second binary signal.

8. An optical disk apparatus according to claim 6, wherein said first estimating means comprises:

comparator means for converting the signal reproduced by said first reproducing means into a binary signal;

phase-locked loop (PLL) means for producing at least one signal selected from a group including a first signal having a reference frequency, a second signal having a higher frequency than said reference frequency and a third signal having a lower frequency than said reference frequency;

means for extracting data from said binary signal based on at least one of said first signal, said second signal and said third signal; and bit error judgement means for judging bit errors contained in said data; and wherein said second estimating means comprises:

second comparator means for converting the signal reproduced by said second reproducing means into a second binary signal;

phase-locked loop (PLL) means for producing at least one signal selected from a group including a fourth signal having a second reference frequency, a fifth signal having a higher frequency than said second reference frequency and a sixth signal having a lower frequency than said second reference frequency;

means for extracting data from said second binary signal based on at least one of said fourth signal, said fifth signal and said sixth signal; and bit error judgement means for judging bit errors contained in said data extracted from said second binary signal.

9. An optical disk apparatus according to claim 6, wherein said first estimating means comprises bit error judgement means for judging bit errors contained in said signal reproduced by said reproduction means and decides said reproduction quality based on said bit errors judged by said bit errors judgment means and wherein said second estimating means comprises second bit error judgement means for judging bit errors contained in said signal reproduced by said second reproduction means and decides said reproduction quality based on said bit errors judged by said second bit error judgment means.

10. An optical disk apparatus according to claim 6, wherein said first estimating means decides said reproduction quality based on an amplitude of the signal reproduced by said first reproducing means and wherein said second estimating means decides said reproduction quality based on an amplitude of the signal reproduced by said second reproducing means.

11. An optical disk apparatus according to claim 1, further comprising means for enabling said optimal level of said power setting to be established only if at least one of predetermined conditions relating to operation of said apparatus is satisfied.

12. An optical disk apparatus according to claim 11, wherein said predetermined conditions include at least one of those moments when said apparatus is powered on, when said recording medium is replaced, when data recorded by a user has become defective, when a prescribed time length since the optimal power correction has expired, when the temperature has changed beyond a prescribed limit, when a shock or vibration in excess of a prescribed value is applied, and when the operation of said apparatus is required by a user.

* * * * *